(12) United States Patent
Skulachev et al.

(10) Patent No.: US 12,077,553 B1
(45) Date of Patent: Sep. 3, 2024

(54) CRYSTALLINE FORM OF ANTIOXIDANT COMPOUND

(71) Applicant: Mitotech Ltd, London (GB)

(72) Inventors: Maxim Skulachev, Rishon-Lezion (IL); Tatiana Zinevich, Moscow (RU); Olga Kirichenko, Moscow (RU); Anton Petrov, Woodland Hills, CA (US); Vadim Tashlitsky, Moscow (RU)

(73) Assignee: Mitotech Ltd, London (GB)

( * ) Notice: Subject to any disclaimer, the term of this patent is extended or adjusted under 35 U.S.C. 154(b) by 0 days.

(21) Appl. No.: 18/388,529

(22) Filed: Nov. 9, 2023

(51) Int. Cl.
*C07F 9/54* (2006.01)
(52) U.S. Cl.
CPC ........ *C07F 9/5456* (2013.01); *C07B 2200/13* (2013.01)

(58) Field of Classification Search
CPC .................. C07F 9/5456; C07B 2200/13
See application file for complete search history.

(56) References Cited

U.S. PATENT DOCUMENTS

2008/0176929 A1* 7/2008 Skulachev ............ C07F 9/5456
549/388

\* cited by examiner

*Primary Examiner* — Deborah D Carr
(74) *Attorney, Agent, or Firm* — Verrill Dana, LLP (57) ABSTRACT

A novel crystalline form of 2,3-dimethyl-1,4-benzoquinone-5-decyl-triphenylphosphonium bromide is provided. The crystalline form was found to have X-ray powder diffraction peaks at 19.25, 21.507, and 23.074 degrees 2 theta, ±0.2 degrees 2 theta. Also provided are industrially feasible methods for manufacture of the crystalline form with high purity.

20 Claims, 5 Drawing Sheets

CRYSTALLINE FORM OF ANTIOXIDANT COMPOUND

FIELD

Aspects of the invention relate to a crystalline form of an antioxidant compound, and to methods for making such a crystalline form.

BACKGROUND

U.S. Pat. No. 9,328,130, which is incorporated herein by reference, describes the preparation of the compound 2,3-dimethyl-1,4-benzoquinone-5-decyl-triphenylphosphonium bromide, also known as SkQ1. The structure of SkQ1 is:

The compound was isolated as a highly hygroscopic tan solid.

SUMMARY

The present technology provides a novel crystalline form of SkQ1, a mitochondrially targeted antioxidant compound. The crystalline form was found to have X-ray powder diffraction peaks at 19.25, 21.507, and 23.074 degrees 2 theta, ±0.2 degrees 2 theta. In addition, the technology provides industrially feasible methods for manufacture of the crystalline form with high purity.

The technology can be summarized in the following list of features.

1. A crystalline form of the compound 2,3-dimethyl-1,4-benzoquinone-5-decyl-triphenylphosphonium bromide.
2. The crystalline form according to feature 1, wherein said crystalline form comprises greater than 98% by weight of said compound.
3. The crystalline form according to feature 2, wherein said crystalline form comprises greater than 99% by weight of said compound.
4. The crystalline form according to any of the preceding features, having X-ray powder diffraction peaks at 19.25, 21.507, and 23.074 degrees 2 theta, ±0.2 degrees 2 theta.
5. The crystalline form according to feature 4, further having X-ray powder diffraction peaks at 4.876, 8.059, 11.56, and 24.515 degrees 2 theta±0.2 degrees 2 theta.
6. A method for preparation of a crystalline form of the compound 2,3-dimethyl-1,4-benzoquinone-5-decyl-triphenylphosphonium bromide, the method comprising:
   (a) providing an alcoholic solution of 2,3-dimethyl-1,4-benzoquinone-5-decyl-triphenylphosphonium bromide;
   (b) adding a crystallization solvent to the alcoholic solution, wherein the crystallization solvent is selected from the group consisting of an ether and an ester; and
   (c) removing the alcohol and the crystallization solvent to obtain the crystalline form.
7. The method according to feature 6, wherein the alcoholic solvent comprises ethanol and/or isopropanol.
8. The method according to feature 6, wherein the alcoholic solution comprises ethanol.
9. The method according to any of features 6-8, wherein the alcoholic solution comprises from about 1 to about 3 volumes of alcohol relative to said 2,3-dimethyl-1,4-benzoquinone-5-decyl-triphenylphosphonium bromide.
10. The method according to feature 9, wherein the alcoholic solution comprises 2 volumes of alcohol relative to said 2,3-dimethyl-1,4-benzoquinone-5-decyl-triphenylphosphonium bromide.
11. The method according to any of features 6-10, wherein the crystallization solvent is a carboxylate ester.
12. The method according to feature 11, wherein the carboxylate ester is ethyl acetate.
13. The method according to any of features 6-12, wherein the crystallization solvent is added in an amount of from about 5 to about 10 volumes relative to the 2,3-dimethyl-1,4-benzoquinone-5-decyl-triphenylphosphonium bromide.
14. The method according to any of features 6-13, wherein the solvents are removed in step (c) by vacuum.
15. A composition comprising 2,3-dimethyl-1,4-benzoquinone-5-decyl-triphenylphosphonium bromide at a purity of greater than 98% by weight.
16. The composition according to feature 15 comprising said 2,3-dimethyl-1,4-benzoquinone-5-decyl-triphenylphosphonium bromide at a purity of greater than 99% by weight.
17. The composition according to feature 15 or 16, wherein said 2,3-dimethyl-1,4-benzoquinone-5-decyl-triphenylphosphonium bromide is stable for at least two months when stored at room temperature and exposed to natural light having a natural day/night cycle.
18. The crystalline form comprising the compound 2,3-dimethyl-1,4-benzoquinone-5-decyl-triphenylphosphonium bromide according to any of features 1-5, wherein the crystalline form is produced by a method comprising:
   (a) providing an alcoholic solution of 2,3-dimethyl-1,4-benzoquinone-5-decyl-triphenylphosphonium bromide;
   (b) adding a crystallization solvent to the alcoholic solution, wherein the crystallization solvent is selected from the group consisting of an ether and an ester; and
   (c) removing the alcohol and the crystallization solvent to obtain the crystalline form.
19. The crystalline form according to feature 18, wherein the alcoholic solution comprises ethanol and the crystallization solvent comprises ethyl acetate.
20. The crystalline form according to feature 19, wherein the crystalline form comprises greater than 98% by weight of said compound.

DETAILED DESCRIPTION

SkQ1 was previously prepared as a non-crystalline, amorphous, hygroscopic substance which had an oily appearance. Hygroscopic solids are associated with numerous difficulties when attempting to use them for pharmaceutical compositions, including low stability and difficulty in handling.

Attempts were made to form alternative salts instead of the bromide salt, to bring about crystallization of SkQ1, but these attempts were not successful.

Crystallization of the bromide salt by using a number of solvents, individually or in combination, was attempted. As shown in the experimental data below, only certain solvents used resulted in crystalline SkQ1.

Accordingly, it was determined that a process for preparation of crystalline SkQ1 can be performed by obtaining a crude or amorphous SkQ1, preparing an alcoholic solution of SkQ1, adding a crystallization solvent, preferably an ether or an ester, and removing the resulting solvent upon crystallization. According to an embodiment, the alcoholic solution was prepared with a solvent selected from the group consisting of ethanol and isopropanol. According to an embodiment, the alcoholic solution was prepared in an amount of 1-3 volumes relative to crude SkQ1, preferably 2 volumes. According to an embodiment of the process, the crystallization solvent is an ester. According to an embodiment, the crystallization solvent is added in an amount of from about 5 to about 10 volumes relative to the volume of crude SkQ1. Preferably, the crystallization solvent is a carboxylate ester, most preferably ethyl acetate.

Crystalline SkQ1 formed according to examples described herein had advantages compared to the previously known amorphous form, as it was obtained in higher purity levels, and was more resistant to degradation, in particular photodegradation. Experiments designed to stabilize the previous amorphous form of SkQ1 by lyophilization have only yielded material with less than 98% purity. However, the crystalline form can be obtained at greater than 98% purity, or greater than 99% purity, or greater than 99/5% purity, or greater than 99.8% purity, or even greater than 99.9% purity.

Single-crystal X-ray diffraction was carried out with a Bruker D8 VENTURE diffractometer equipped with a Cu-Kα radiation source (λ=1.54178 Å). A crystal with dimensions of 0.42×0.34×0.12 mm was selected for the study. The following crystallographic data were obtained: $C_{36}H_{42}BrO_2P$, M=617.57 g/mol, monoclinic, space group $P2_1/c$, cell parameters at T=290K a=18.7276(11), b=13.9413(9), c=12.7286(8) Å, β=97.809(2)°, V=3292.5(4) Å$^3$, Z=4, $d_{calc.}$=1.246 g/cm$^3$, μ (Cu-Kα)=23.75 cm$^{-1}$.

Data collection was carried out using the ω-scan technique at room temperature (T=290(2) K), 30067 reflections of which 5835 independent reflections ($R_{int}$=0.0269) with $2θ_{max}$=135.0° were collected and used in the refinement. Semiempirical absorption correction based on equivalent reflections was applied using the SADABS program (SADABS, Version 2016/5, Bruker AXS Inc., Madison, Wisconsin, USA). The structure was solved by direct methods and refined by the full matrix least-squares technique against F$^2$ with the anisotropic thermal parameters for all non-hydrogen atoms. The hydrogen atoms were placed geometrically and included in the structure factor calculations in a riding motion approximation with isotropic thermal parameters $U_{iso}(H)=1.5U_{eq}(C)$ for hydrogen atoms of methyl groups and $U_{iso}(H)=1.2U_{eq}(C)$ for other carbon atoms. The refinement converged to $wR_2$=0.0899 and GOF=1.032 for all independent reflections ($R_1$=0.0314 was calculated against F for 5375 observed reflections with I>2σ(I)). All calculations were performed using the SHELXL program package (G. M. Sheldrick, Crystal structure refinement with SHELXL, *Acta Cryst.* C71 (2015) 3-8. doi.org/10.1107/S2053229614024218).

Figure 3A:
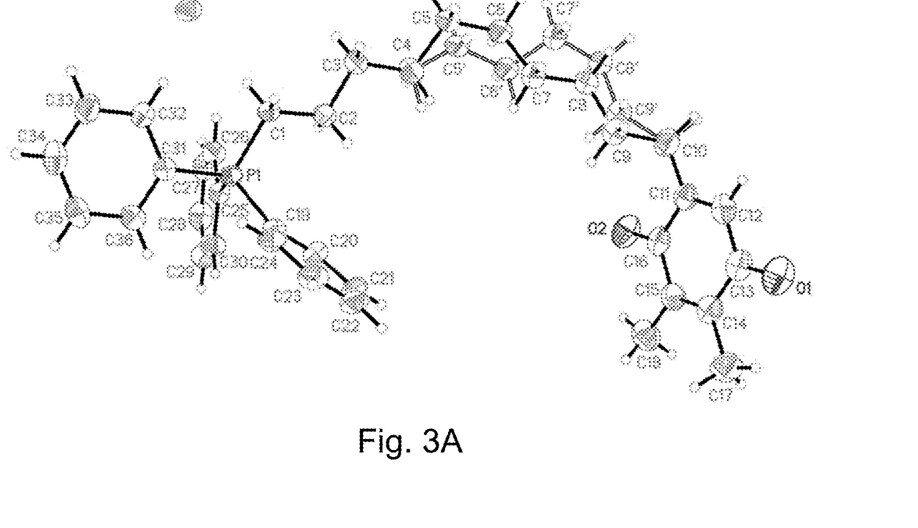
FIG. 3A is a representation of the structure of 2,3-dimethyl-1,4-benzoquinone-5-decyl-triphenylphosphonium bromide as present in a room temperature (290° K.) crystalline form of the present technology.
Figure 3B:
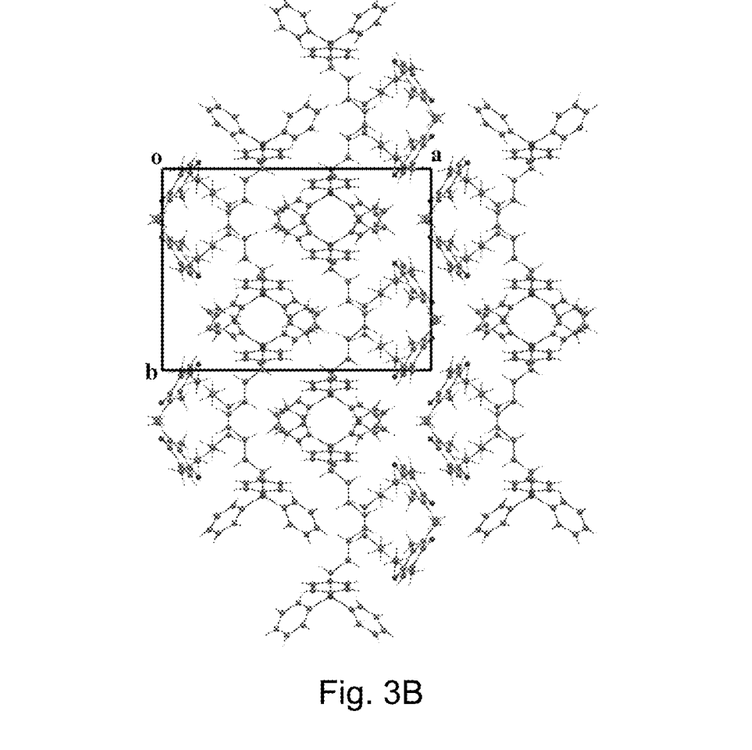
FIG. 3B shows the packing of a room temperature crystal of 2,3-dimethyl-1,4-benzoquinone-5-decyl-triphenylphosphonium bromide, with the unit cell indicated by the rectangle.

FIG. 3A shows the molecular structure of the crystalline form at room temperature (T=290K). Non-hydrogen atoms are presented as thermal ellipsoids at the 30% probability level. The C5, C6, C7, C8, C9 atoms in the aliphatic chain are disordered over two positions with nonequal occupancies of 0.826(3)/0.174(3) (minor component is drawn with open lines). FIG. 3B shows a fragment of the crystal packing (projection along c crystal axis). The minor component of the disordered atoms is omitted for clarity.

Figure 1A:
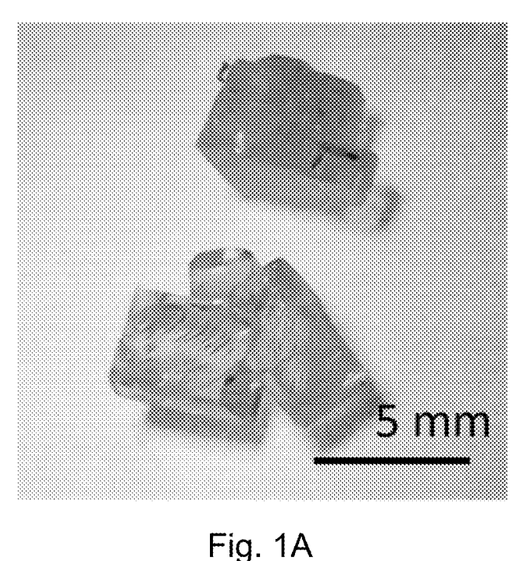
FIGS. 1A and 1B are photographs of a crystalline form of 2,3-dimethyl-1,4-benzoquinone-5-decyl-triphenylphosphonium bromide prepared according to the present technology.
Figure 1B:
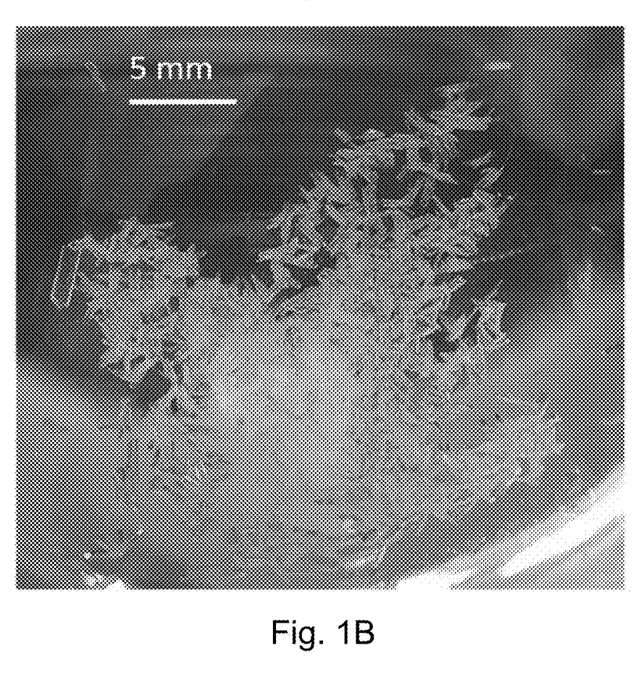
Figure 2:
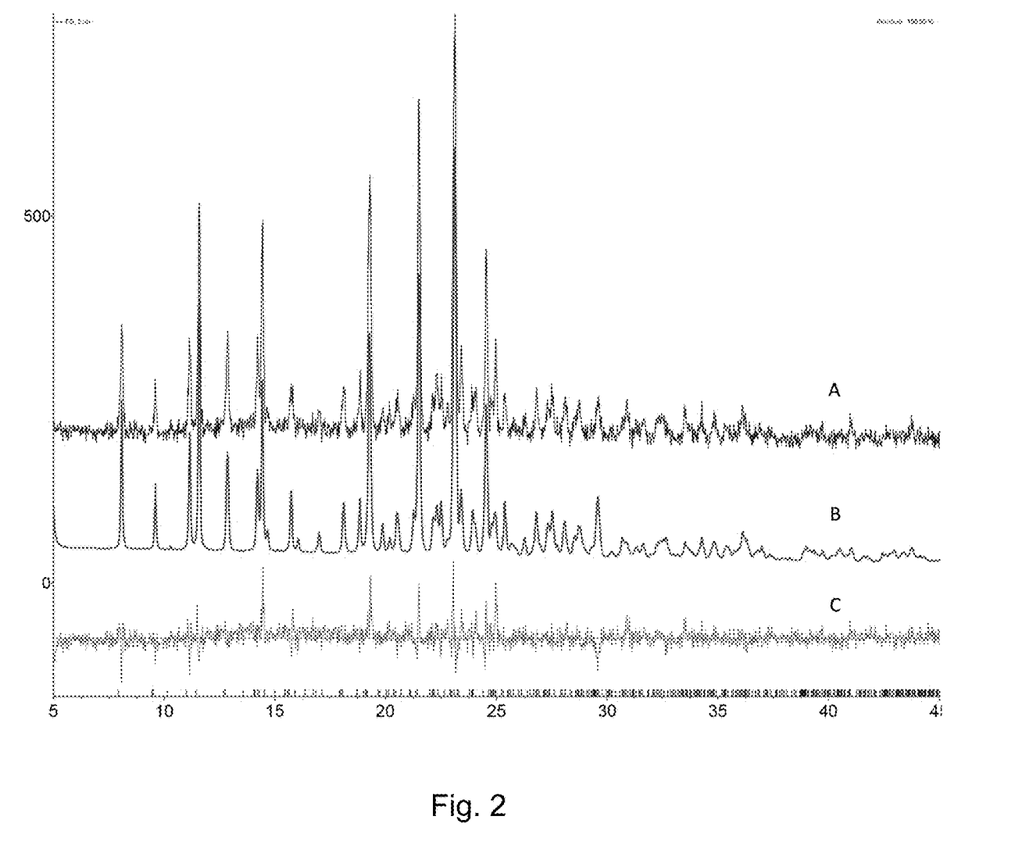
FIG. 2 shows X-Ray Powder Diffraction (XRPD) spectra of crystalline 2,3-dimethyl-1,4-benzoquinone-5-decyl-triphenylphosphonium bromide prepared according to the present technology. Spectrum A is an XRPD spectrum obtained from a measurement, Spectrum B is a calculated spectrum based on the crystal structure of the compound, and Spectrum C is the difference between spectra A and B.

The phase purity of a polycrystalline sample was confirmed by X-ray powder diffraction (FIG. 2). Powder X-ray diffraction data were collected using a Bruker D8 Advance diffractometer (Cu-Kα radiation source, λ=1.54 Å, Ni-filter, LYNXEYE detector, geometry reflection). The diffraction patterns were collected at RT and over an angular range of 5 to 45° with a step size of 0.02° per step and a dwell time of 5 s per increment.

Figure 3C:
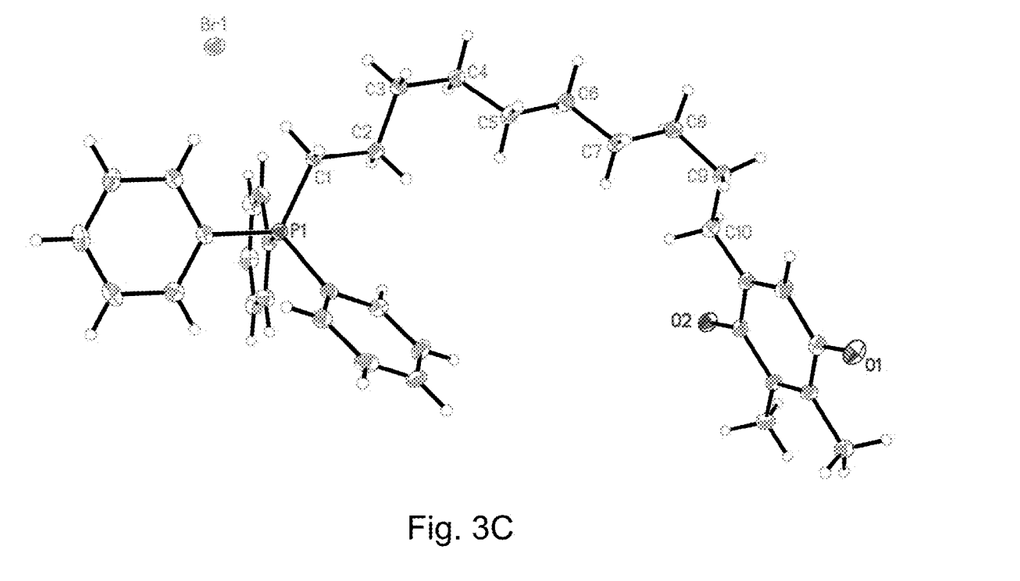
FIG. 3C is a representation of the structure of 2,3-dimethyl-1,4-benzoquinone-5-decyl-triphenylphosphonium bromide as present in a low temperature (120° K.) crystalline form of the present technology.

The single-crystal X-ray diffraction experiment at low temperature (T=120K) was carried out with a Bruker Smart APEX-II diffractometer equipped with low temperature Cobra system (Oxford Cryosystems) with a Mo-Kα radiation source (λ=0.71073 Å). A crystal with dimensions of 0.35×0.35×0.15 mm$^3$ was selected for the study. The following crystallographic data were obtained: $C_{36}H_{42}BrO_2P$, M=617.57 g/mol, monoclinic, space group $P2_1/c$, cell parameters at T=120K a=19.738(6), b=12.874(4), c=12.796(4) Å, β=101.372(4)°, V=3187.9(16) Å$^3$, Z=4, $d_{calc.}$=1.287 g/cm$^3$, μ (Mo-Kα)=13.70 cm$^{-1}$. Data collection was carried out using the ω-scan technique at low temperature (T=120(2) K), 31601 reflections of which 6970 independent reflections ($R_{int}$=0.0803) with $2θ_{max}$=54.0° were collected and used in the refinement. Semiempirical absorption correction based on equivalent reflections was applied using the SADABS program. The structure was solved by direct methods and refined by the full matrix least-squares technique against F$^2$ with the anisotropic thermal parameters for all non-hydrogen atoms. The hydrogen atoms were placed geometrically and included in the structure factors calculations in a riding motion approximation with isotropic thermal parameters $U_{iso}(H)=1.5U_{eq}(C)$ for hydrogen atoms of methyl groups and $U_{iso}(H)=1.2U_{eq}(C)$ for other carbon atoms. The refinement converged to $wR_2=0.1034$ and GOF=1.022 for all independent reflections ($R_1=0.0441$ was calculated against F for 4209 observed reflections with $I>2\sigma(I)$). All calculations were performed using the SHELXL program package. FIG. 3C shows the molecular structure of the crystalline form at low temperature, and FIG. 3D shows the crystal packing.

Figure 3D:
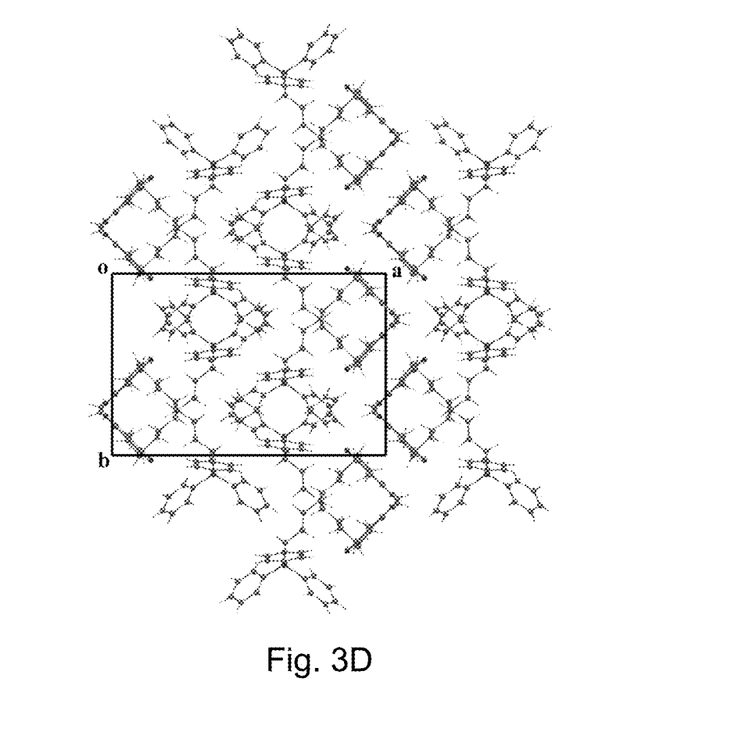
FIG. 3D shows the packing of a low temperature crystal of 2,3-dimethyl-1,4-benzoquinone-5-decyl-triphenylphosphonium bromide, with the unit cell indicated by the rectangle.
Figure 4A:
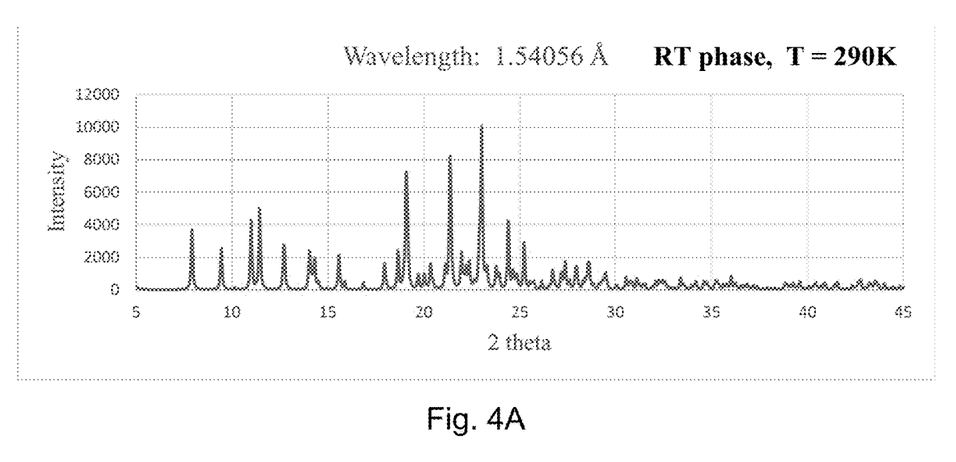
FIGS. 4A and 4B show calculated diffraction patterns for the room temperature and low temperature crystalline forms of 2,3-dimethyl-1,4-benzoquinone-5-decyl-triphenylphosphonium bromide.
Figure 4B:
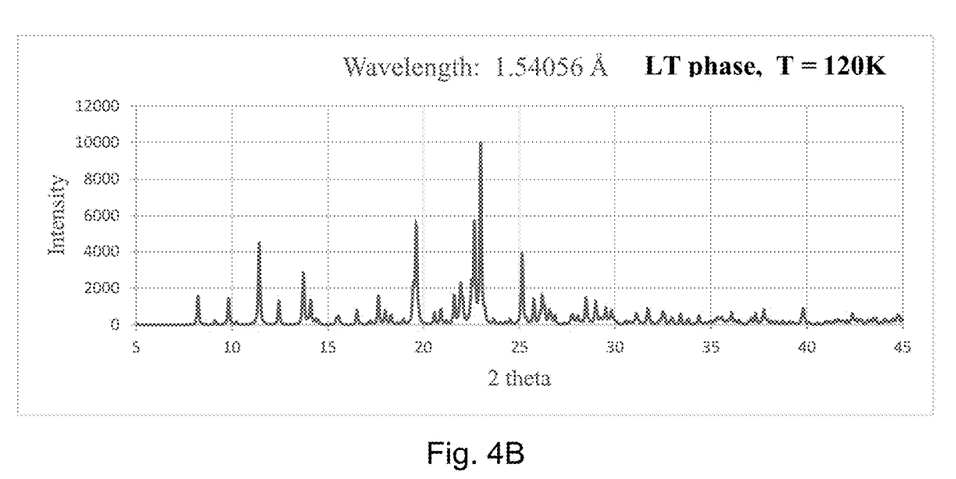

The structural difference between the high-temperature and low-temperature phases is small and has almost no effect on the relative arrangement of molecules in the crystal (compare FIGS. 3B and 3D. However, a relatively small change in unit cell parameters leads to a noticeable difference in the set of characteristic peaks in the powder diffraction pattern (see FIGS. 4A and 4B and Table 2).

TABLE 2

| | h | k | l | 2-theta, deg. | d-spacing, Å | $F^2$ | Intensity |
|---|---|---|---|---|---|---|---|
| RT-phase | | | | | | | |
| 1 | 1 | 1 | 0 | 7.92 | 11.1456 | 4899.95 | 3706.59 |
| 2 | 0 | 1 | 1 | 9.44 | 9.35218 | 4848.42 | 2551.49 |
| 3 | 1 | 1 | 1 | 11.00 | 8.03228 | 10782.30 | 4255.43 |
| 4 | 2 | 1 | 0 | 11.44 | 7.72331 | 13560.10 | 4890.47 |
| 5 | 1 | 2 | −2 | 19.10 | 4.64662 | 43506.00 | 7268.09 |
| 6 | 2 | 3 | 0 | 21.38 | 4.15495 | 74269.50 | 8192.32 |
| 7 | 4 | 2 | 0 | 23.02 | 3.86165 | 112973.00 | 10000.00 |
| LT-phase | | | | | | | |
| 1 | 1 | 1 | 0 | 8.24 | 10.7185 | 3289.89 | 1565.38 |
| 2 | 0 | 1 | 1 | 9.84 | 8.98464 | 4343.99 | 1445.31 |
| 3 | 1 | 1 | 1 | 11.40 | 7.74214 | 8148.67 | 3642.94 |
| 4 | 2 | 1 | 0 | 11.42 | 7.7345 | 10539.80 | 4493.80 |
| 5 | 1 | 2 | −2 | 19.62 | 4.51877 | 63533.10 | 5518.88 |
| 6 | 2 | 3 | 0 | 22.66 | 3.92279 | 76900.40 | 5695.07 |
| 7 | 4 | 2 | 0 | 22.98 | 3.86725 | 159130.00 | 10000.00 |

EXAMPLES

The following examples are provided to illustrate certain particular features and/or embodiments. These examples should not be construed to limit the disclosure to the particular features or embodiments described.

Example 1. Salt Formation

The acetate salt derivative of SKQ1 was prepared using an anionic exchange resin. The acetate salt was dissolved in tetrahydrofuran at 40° C. Various acids were added as 1 molar solutions in THF, except for fumaric acid, which was added in 0.5 molar methanol, in the presence of solvent 1 at room temperature. No solids were observed and either a solution or oil was obtained, so the solvent was evaporated, and an oil was obtained. The resulting oils were slurried in solvent 2 mixed, then cooled to between 0 and 4° C. No crystallization was visible in any of the samples. The results are detailed in Table 1 below.

TABLE 1

| Salt-form | Solvent 1 | Residue after evaporation to dryness | Solvent 2 | Cooling to 0-4° C. |
|---|---|---|---|---|
| Acetate | Ethanol | Oil | Ethanol:water 10% | Oil |
| Acetate | Isopropyl alcohol (IPA) | Oil | 1-methoxy-2-propanol | Oil |
| Acetate | Acetone | Oil | Anisole | Oil |
| Acetate | Methyl ethyl ketone (MEK) | Oil | Hexane | Oil |
| Acetate | Tetrahydrofuran (THF) | Oil | EtOAc:hexane 1:1 | Oil |
| Acetate | Water | Oil | nitromethane | Oil |
| Acetate | Ethyl acetate (EtOAc) | Oil | 3-methyl-1-butanol | Oil |
| Acetate | Heptane | Oil | toluene | Oil |
| Acetate | Dichloromethane (DCM) | Oil | chloroform | Oil |
| Acetate | THF/10% water | Oil | 1,2-dimethoxyethane | Oil |
| Mesylate | Ethanol | Oil | Ethanol:water 10% | Oil |
| Mesylate | IPA | Oil | 1-methoxy-2-propanol | Oil |
| Mesylate | Acetone | Oil | Anisole | Oil |
| Mesylate | MEK | Oil | Hexane | Oil |
| Mesylate | THF | Oil | EtOAc:hexane 1:1 | Oil |
| Mesylate | Water | Oil | nitromethane | Oil |
| Mesylate | EtOAc | Oil | 3-methyl-1-butanol | Oil |
| Mesylate | Heptane | Oil | toluene | Oil |
| Mesylate | DCM | Oil | chloroform | Oil |
| Mesylate | THF/10% water | Oil | 1,2-dimethoxyethane | Oil |
| Saccharinate | THF | Oil | | Oil |
| Oxalate | THF | Oil/gum | | Oil/gum |
| Maleate | THF | Oil | | Oil |
| Besylate | THF | Oil/gum | | Oil/gum |
| Fumarate | THF/MeOH | Oil | | Oil |
| Mandelate | THF | Oil | | Oil |
| Citrate | THF | Oil | | Oil |
| Benzoate | THF | Oil/gum | | Oil/gum |
| Maleate | THF | Oil | | Oil |
| Succinate | THF | Oil/gum | | Oil/gum |

As shown in Table 1, oil or oil/gum-like solids were obtained as a result of each of the processes, indicating that the formation of a crystalline form of SkQ1 was not possible, even though over 10 alternate salts were attempted in a wide range of solvents and combinations of solvents.

Example 2A: Crystallization Attempts in Various Solvents

As a general procedure, a solvent at an amount of 20-30 volumes (V), was added to oily SkQ1 at room temperature, and the mixture was vigorously triturated, then the solvent was decanted. This procedure was repeated multiple times. The residue was then dried under vacuum using a rotary evaporator.

This procedure was used with the following solvent groups, with one or more representative solvents from each group: alcohols (representative—EtOH); chlorinated hydrocarbons (methylene chloride, chloroform); hydrocarbons (representatives—pentane, hexane, heptane); aromatic hydrocarbons (representative—toluene); esters (representative—ethyl acetate). All of these solvents tested for crystallization were lacking for a number of reasons, including lack of crystallization or appearance of impurities. Only pentane led to crystallization, as powder was visible only after 12 repeats of adding solvent, cooling and decanting, but the process was slow and laborious. Hexane and heptane were also attempted as solvents for crystallization, but they led to partial degradation of SkQ1.

Example 2B: Crystallization in Diethyl Ether

A portion of diethyl ether was added to oily SkQ1 at room temperature (approximately 200-250 ml of diethyl ether to 30-50 g of oily SkQ1), the mixture was vigorously stirred with a spatula, and the solvent was decanted. The procedure was repeated 10 (or more) times until complete crystallization was achieved. The resulting fine (crystalline) light yellow powder was dried in a vacuum.

The resulting powder and the combined residual ether extracts were analyzed by HPLC RP with UV detection (226 nm). The results of the analysis showed that during the procedure minor impurities contained in the oily starting material accumulated in ether solution. The crystalline product obtained was of an exceptionally high degree of purity as determined by HPLC. This crystallization process, although it uses multiple batches of solvent, increases purity of the SkQ1 product.

Example 2C: Crystallization in Diethyl Ether, Additional Process

SkQ1 (1.2 g) was dissolved at room temperature in 10 ml of ethanol, and diethyl ether was added in small portions until the solution became slightly cloudy (the total amount of added diethyl ether was ~160 ml). The mixture was kept at room temperature (protected from light) overnight, filtered, and the clear solution was left in a refrigerator (at a temperature of 6-8° C.) for several days. This resulted in the precipitation of bright yellow crystals, which were selected as suitable for X-ray diffraction studies, and which had a melting point at 130.9° C.

Example 3A: Alternate Methods for Crystallization Through Seeding with Ethanolic Solution and Diethyl Ether Methods described in Example 2A and 2B, while leading to crystallization of SkQ1, high volumes of highly flammable solvents are required, and upscaling such procedures may be difficult.

SkQ1 single crystals were obtained. 403 mg of oily SKQ1 were dissolved in 8.3 V of ethanol; small portions of diethyl ether (63 V) were added until the solution became cloudy, and it was left overnight at room temperature without exposure to light. The solution was filtered and divided into 4 portions (8.25 mL of each) the following morning. One of the portions of solution was left in the refrigerator for three weeks. In the second portion, single crystals were used as seed and refrigerated (6~8° C.) for three weeks. With portions 3 and 4, fine powder and crushed single crystals were added while stirring at RT. In neither portion were any crystals observed; only the seed sample remained in solution after 1 h. Portions 3 and 4 were refrigerated (6~8° C.) for three weeks. None of the four experiments yielded crystals, and in portions 3 and 4, the seed samples remained solid in solution.

Example 3B: Crystallization Through Anti-Solvent

As SkQ1 is sparingly soluble in water, crystallization was attempted by introducing SkQ1 oil into various solvent systems having multiple solvents in various volumes relative to the starting oil, as described in Table 2:

TABLE 2

| Solvent | Conditions | |
|---|---|---|
| Dimethyl sulfoxide (DMSO)/water | Room temperature cooled to 0-5° C. | No fine solid |
| Ethanol (2 V)/Water (6 V) | Room temperature cooled to 0-5° C. | Small amount of fine solid |
| Toluene (5 V)/Methyl tert-butyl ether (MTBE) (5 V) | Room temperature, 0-5° C. | Oiling out |

None of the antisolvent systems tested in Table 2 led to a feasible process having decent yields.

Example 3C: Crystallization with Ethyl Acetate

An attempt to crystallize with the solvent ethyl acetate was performed, in light of the success of crystallization with diethyl ether. 116 mg of oily SKQ1 in ethyl acetate was added to 5V of ethyl acetate was added dropwise to the oily SKQ1. Initially a clear solution, SKQ1 crystallized after two minutes of agitation. The resultant fine solid was easily filtered, but the majority of the particulates adhered to the vial walls. This could be difficult to filter on a large scale. As a result, 10V of methyl tert-butyl ether (MTBE) was added, and agitated at 1 hour at room temperature, the fine solid was filtered and dried on rotavapor at 30° C. for 3 hours, yielding a fine light-yellow solid with a 79% yield.

Although example 2A indicates that crystallization was not possible with ethyl acetate, it was assumed that the previous attempts were not successful due to water impurities present in the ethyl acetate.

Similar results were obtained with 2V ethanol and 5V of ethyl acetate, resulting in a 70% yield.

In both of the above experiments, the amounts of residual solvents were determined by $^1$H NMR to be less than 5000 parts per million (ppm).

Example 3D: Crystallization with Alcohol/Ethyl Acetate Mixture and MTBE

Attempts to reduce the concentration of ethanol and to use isopropanol were undertaken. SkQ1 in an amount of 177 mg was added to an ethanol (1V)-ethyl acetate (5V) mixture. In another experiment, SkQ1 in an amount of 178 mg was added to an isopropanol (1V)-ethyl acetate (5V) mixture. After agitating at room temperature for 0.5 hours, no crystallization was evident, indicating SkQ1 is highly soluble in protic solvents such as ethanol and isopropanol. To each of the above solutions, 5V ml of MTBE was added, initially oiling out the supersaturated solution. After leaving the solution overnight at room temperature, crystals were formed. This process with varying amounts of ethanol (from 0.274-0.574 V) led to similar results of solid formation after MTBE addition. Similarly, ethyl acetate was increased to 10V, with similar results of fine solid formation only after adding MTBE, but with lower yields. When ethanol solvent amounts were increased ton 1.174 V, crystallization occurred after adding MTBE, but yields were low.

Example 3E: Crystallization with Acetone

Acetone is a solvent more polar than ethyl acetate, and is water-miscible. 177 mg of oily SkQ1 was added to 2V of acetone dropwise, while agitating at room temperature. No solid was formed even after 0.5 hours of stirring. The homogenous solution was divided into 3 equal portions. When water (5V) was used as an antisolvent in one of the portions, a clear solution was formed, when kept at room temperature overnight. When MTBE (5V) was used as an antisolvent in one of the portions, oiling out was apparent, and after 1-3 minutes of agitation, a fine solid was formed. When heptane (5V) was used as an antisolvent in one of the portions, oiling out was apparent, and after 1-3 minutes of agitation, a fine solid was formed, but the fine solid was hygroscopic and it melted during filtration.

Example 3F: Crystallization with Ethyl Acetate and MTBE

Crystallization was performed with ethyl acetate, by directly introducing oily SkQ1 into ethyl acetate at various volumes optionally with various solvents at 0-5°. Yields of about 70% were obtained with using ethyl acetate (5V) and MTBE (5V); ethyl acetate and heptane (5V each); ethyl acetate (10V); ethyl acetate (3V) and MTBE (7V); and ethyl acetate (3V) and heptane(7V). When crystallization was attempted with 5V of ethyl acetate and 10V MTBE at room temperature, and agitating for 1 hour, this was found to be an optimal crystallization condition, and a yield of 98% was obtained. Following filtration, samples were dried in a rotary evaporator at 30° C. for 1 hour, to reduce solvent levels to below 500 parts per million (ppm).

Example 4: Large Scale Crystallization of SkQ1

7.52 g of SKQ1 oil (having an ethanol content of 13.71% by weight, which is equal to 0.174 V) was transferred to a 100 mL round bottom flask and equipped with an overhead stirrer. While stirring (300 rpm), 37.6 mL of ethyl acetate (5 V) was added over 2 minutes at room temperature. Initially, the solution became homogenous, and after stirring (400 rpm) for 2-3 minutes, the solution became turbid. After an additional 1-2 minutes of stirring (400 rpm), a fine crystalline solid was formed, and the stirring was continued for 30 minutes at room temperature. 37.6 mL of MTBE (5 V) was added dropwise over 5 min at room temperature (600 rpm; 7.5 mL/min) and stirring was continued for 1 h at room temperature. Then it was cooled to 0° C. (internal temperature) and stirred at this temperature for 2 hours. The resulting fine crystalline solid was filtered on a sintered funnel, and the filter cake was washed with 4 V of cold MTBE (2 V×2 times) and dried for 5 minutes in a sintered funnel. The fine powder was transferred to a Petri dish and dried in a vacuum oven at 30° C. for 3 hours, which provided bright yellow crystalline SKQ1 in an 81% yield (6.1 g). Purity as determined by HPLC was 98.39%.

Example 5: X-Ray Diffraction Data

Fine powder produced according to Example 4 was subjected to X-Ray Powder Diffraction (XRPD). The resulting chromatograms are shown in FIG. 2. The results are expressed in degrees 2 theta.

The most pronounced peaks were found at 4.876, 8.059, 11.56, 19.25, 21.507, 23.074, 24.515 degrees 2 theta. When compared to XRPD profiles of powder formed in accordance with Example 2B, the characteristic peaks were found to be within ±0.2 degrees 2 theta of one another.

Example 6: Stability of Crystalline SkQ1 Versus Amorphous Forms

Amorphous SkQ1 was found to be photosensitive, possibly due to the quinone moiety. As a result, SkQ1 was stored in light protective packaging or a dark glass container. The crystalline form of SkQ1 as prepared in Example 2C and was tested by placing 50 mg portions at room temperature in transparent plastic vials, under conditions of natural change of day and night illumination with indirect sunlight. SkQ1 was analyzed for sample photodegradation at 6 hours, 4 days, 1 month and then 2 months, but no degradation was found in any of the samples. Similarly, crystalline SkQ1 was found to be resistant to gamma radiation, whereas oil form degraded when undergoing sterilization by gamma radiation.

In view of the many possible embodiments to which the principles of the disclosed invention may be applied, it should be recognized that the illustrated embodiments are only preferred examples of the invention and should not be taken as limiting the scope of the invention. While the present invention has been described in conjunction with certain preferred embodiments, one of ordinary skill, after reading the foregoing specification, will be able to effect various changes, substitutions of equivalents, and other alterations to the compositions and methods set forth herein.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

All base sizes, amino acid sizes, and molecular weight or molecular mass values given herein for nucleic acids or polypeptides are approximate. The term "comprises" as used herein means "includes." The abbreviation, "e.g." is derived from the Latin exempli gratia, and is used herein to indicate a non-limiting example. Thus, the abbreviation "e.g." is synonymous with the term "for example". All the materials, methods, and examples provided herein are illustrative and not intended to be limiting.

What is claimed is:

1. A crystalline form of the compound 2,3-dimethyl-1,4-benzoquinone-5-decyl-triphenylphosphonium bromide.

2. The crystalline form according to claim 1, wherein said crystalline form comprises greater than 98% by weight of said compound.

3. The crystalline form according to claim 2, wherein said crystalline form comprises greater than 99% by weight of said compound.

4. The crystalline form according to claim 1, having X-ray powder diffraction peaks at 19.25, 21.507, and 23.074 degrees 2 theta, ±0.2 degrees 2 theta.

5. The crystalline form according to claim 4, further having X-ray powder diffraction peaks at 4.876, 8.059, 11.56, and 24.515 degrees 2 theta±0.2 degrees 2 theta.

6. A method for preparation of a crystalline form of the compound 2,3-dimethyl-1,4-benzoquinone-5-decyl-triphenylphosphonium bromide, the method comprising:
    (a) providing an alcoholic solution of 2,3-dimethyl-1,4-benzoquinone-5-decyl-triphenylphosphonium bromide;
    (b) adding a crystallization solvent to the alcoholic solution, wherein the crystallization solvent is selected from the group consisting of an ether and an ester; and
    (c) removing the alcohol and the crystallization solvent to obtain the crystalline form.

7. The method according to claim 6, wherein the alcoholic solvent comprises ethanol and/or isopropanol.

8. The method according to claim 6, wherein the alcoholic solution comprises ethanol.

9. The method according to claim 6, wherein the alcoholic solution comprises from about 1 to about 3 volumes of alcohol relative to said 2,3-dimethyl-1,4-benzoquinone-5-decyl-triphenylphosphonium bromide.

10. The method according to claim 9, wherein the alcoholic solution comprises 2 volumes of alcohol relative to said 2,3-dimethyl-1,4-benzoquinone-5-decyl-triphenylphosphonium bromide.

11. The method according to claim 6, wherein the crystallization solvent is a carboxylate ester.

12. The method according to claim 11, wherein the carboxylate ester is ethyl acetate.

13. The method according to claim 6, wherein the crystallization solvent is added in an amount of from about 5 to about 10 volumes relative to the 2,3-dimethyl-1,4-benzoquinone-5-decyl-triphenylphosphonium bromide.

14. The method according to claim 6, wherein the solvents are removed in step (c) by vacuum.

15. A composition comprising 2,3-dimethyl-1,4-benzoquinone-5-decyl-triphenylphosphonium bromide at a purity of greater than 98% by weight.

16. The composition according to claim 15 comprising said 2,3-dimethyl-1,4-benzoquinone-5-decyl-triphenylphosphonium bromide at a purity of greater than 99% by weight.

17. The composition according to claim 15, wherein said 2,3-dimethyl-1,4-benzoquinone-5-decyl-triphenylphosphonium bromide is stable for at least two months when stored at room temperature and exposed to natural light having a natural day/night cycle.

18. The crystalline form comprising the compound 2,3-dimethyl-1,4-benzoquinone-5-decyl-triphenylphosphonium bromide according to claim 1, wherein the crystalline form is produced by a method comprising:
 (a) providing an alcoholic solution of 2,3-dimethyl-1,4-benzoquinone-5-decyl-triphenylphosphonium bromide;
 (b) adding a crystallization solvent to the alcoholic solution, wherein the crystallization solvent is selected from the group consisting of an ether and an ester; and
 (c) removing the alcohol and the crystallization solvent to obtain the crystalline form.

19. The crystalline form according to claim 18, wherein the alcoholic solution comprises ethanol and the crystallization solvent comprises ethyl acetate.

20. The crystalline form according to claim 19, wherein the crystalline form comprises greater than 98% by weight of said compound.

* * * * *